(12) United States Patent
Yu et al.

(10) Patent No.: US 10,292,006 B2
(45) Date of Patent: May 14, 2019

(54) METHOD AND SYSTEM FOR OBTAINING LOCATION INFORMATION OF TARGET OBJECT, AND APPARATUS

(71) Applicant: HUAWEI TECHNOLOGIES CO., LTD., Shenzhen, Guangdong (CN)

(72) Inventors: Xiaobo Yu, Beijing (CN); Shuiping Long, Beijing (CN); Henghui Lu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/677,187

(22) Filed: Aug. 15, 2017

(65) Prior Publication Data

US 2018/0020323 A1    Jan. 18, 2018

Related U.S. Application Data

(63) Continuation of application No. PCT/CN2015/073207, filed on Feb. 16, 2015.

(51) Int. Cl.
*H04W 4/02* (2018.01)
*H04L 29/08* (2006.01)
(Continued)

(52) U.S. Cl.
CPC ......... *H04W 4/02* (2013.01); *H04L 29/08657* (2013.01); *H04W 4/80* (2018.02); *H04B 5/02* (2013.01); *H04M 2250/04* (2013.01)

(58) Field of Classification Search
CPC .............. H04W 4/02; H04L 29/08657; H04M 2250/04
(Continued)

(56) References Cited

U.S. PATENT DOCUMENTS 5,355,511 A * 10/1994 Hatano .................... G08G 1/20
455/11.1
5,774,876 A * 6/1998 Woolley ................ G01S 5/0289
235/385
(Continued)

FOREIGN PATENT DOCUMENTS

| CN | 103259765 | 8/2013 |
| CN | 103841514 | 6/2014 |
| JP | 2006211014 | 8/2006 |

OTHER PUBLICATIONS

International Search Report dated Nov. 24, 2015 in corresponding International Patent Application No. PCT/CN2015/073207.
(Continued)

*Primary Examiner* — Hai V Nguyen
(74) *Attorney, Agent, or Firm* — Staas & Halsey LLP

(57) ABSTRACT

The present disclosure relates to the field of short-distance wireless communications technologies, and in particular, to a method and system for obtaining location information of a target object, and an apparatus. In a solution of obtaining location information of a target object in the solutions, at least one second user is selected from a user relationship chain of a first user, and the location information of the target object is obtained by using a second terminal related to the second user. In another solution of obtaining location information of a target object, the location information of the target object is obtained by using a second terminal whose distance to a location represented by first location information is less than or equal to a preset distance.

15 Claims, 13 Drawing Sheets

(51) Int. Cl.
*H04W 4/80* (2018.01)
*H04B 5/02* (2006.01)

(58) Field of Classification Search
USPC .................. 455/41.2, 41.1, 456.1, 45.15
See application file for complete search history.

(56) References Cited

U.S. PATENT DOCUMENTS

| | | | |
|---|---|---|---|
| 6,433,685 B1* | 8/2002 | Struble | B60R 25/00 340/426.28 |
| 6,771,972 B2* | 8/2004 | McDonnell | G01S 13/74 435/9 |
| 7,002,473 B2* | 2/2006 | Glick | G08B 13/1427 340/572.1 |
| 7,318,069 B2* | 1/2008 | Takahashi | G06F 16/2462 |
| 7,551,930 B2* | 6/2009 | Lempio | H04M 1/72572 455/41.2 |
| 7,639,279 B2* | 12/2009 | Shinohara | G06Q 30/0603 348/211.3 |
| 8,370,168 B1* | 2/2013 | Jenkins | G06Q 10/083 705/1.1 |
| 8,457,617 B2* | 6/2013 | Sweeney | G08B 21/023 455/418 |
| 8,498,618 B2* | 7/2013 | Ben Ayed | H04L 63/0492 455/41.2 |
| 8,655,358 B2* | 2/2014 | Nakahama | H04W 4/021 370/338 |
| 8,694,019 B2* | 4/2014 | Vuori | H04W 4/029 455/456.1 |
| 8,810,392 B1* | 8/2014 | Teller | G08B 21/24 235/385 |
| 8,932,368 B2* | 1/2015 | Fitzgerald | H04W 12/12 455/411 |
| 8,977,228 B2* | 3/2015 | Nichols | G08B 13/1427 455/404.2 |
| 9,049,545 B2* | 6/2015 | Duggal | H04W 4/02 |
| 9,177,453 B2* | 11/2015 | Gill | G06F 21/79 |
| 9,185,201 B2* | 11/2015 | Yamauchi | H04M 1/7253 |
| 9,275,206 B2* | 3/2016 | Anand | G06F 21/31 |
| 9,324,066 B2* | 4/2016 | Archer | G06Q 20/10 |
| 9,408,072 B2* | 8/2016 | Bombolowsky | H04W 12/12 |
| 9,473,891 B2* | 10/2016 | Colby | H04W 4/023 |
| 9,509,968 B2* | 11/2016 | Zimmermann | G06F 16/78 |
| 9,665,913 B2* | 5/2017 | Loutit | G06Q 40/08 |
| 9,692,836 B2* | 6/2017 | Zhou | H04W 48/10 |
| 9,741,008 B2* | 8/2017 | Loutit | G06Q 10/08 |
| 9,767,672 B2* | 9/2017 | Thaker | G08B 21/24 |
| 9,900,733 B2* | 2/2018 | Beattie, Jr. | H04W 4/02 |
| 9,953,190 B2* | 4/2018 | Gill | G06F 21/79 |
| 9,961,151 B2* | 5/2018 | Zhou | H04W 48/10 |
| 2002/0019238 A1* | 2/2002 | McDonnell | G01S 13/74 455/456.5 |
| 2002/0027523 A1* | 3/2002 | Muramatsu | B60R 25/00 342/357.57 |
| 2002/0072924 A1* | 6/2002 | Gray | G06Q 10/00 705/1.1 |
| 2003/0074319 A1* | 4/2003 | Jaquette | G06F 21/6218 705/51 |
| 2003/0204526 A1* | 10/2003 | Salehi-Had | G06F 21/35 |
| 2004/0002998 A1* | 1/2004 | Takahashi | G06F 16/2462 |
| 2004/0003024 A1* | 1/2004 | Sairanen | G06F 3/0481 709/201 |
| 2004/0032325 A1* | 2/2004 | Singer | G08B 13/1418 340/539.1 |
| 2004/0123106 A1* | 6/2004 | D'Angelo | G06F 21/32 713/171 |
| 2004/0178907 A1* | 9/2004 | Cordoba | G08B 13/1427 340/539.21 |
| 2005/0048917 A1* | 3/2005 | Weng | G06F 12/1433 455/41.2 |
| 2005/0091338 A1* | 4/2005 | de la Huerga | A61J 1/1437 709/217 |
| 2005/0093986 A1* | 5/2005 | Shinohara | G06Q 30/0603 348/208.1 |
| 2005/0134459 A1* | 6/2005 | Glick | G08B 13/1427 340/572.1 |
| 2005/0260996 A1* | 11/2005 | Groenendaal | H04L 63/102 455/445 |
| 2006/0281987 A1* | 12/2006 | Bartesaghi | G01R 33/56341 600/410 |
| 2007/0291104 A1* | 12/2007 | Petersen | G01S 3/7865 348/14.01 |
| 2008/0153508 A1 | 6/2008 | Hao et al. | |
| 2009/0117926 A1* | 5/2009 | Sterlino | H04M 3/5158 455/466 |
| 2009/0207014 A1* | 8/2009 | Ayed | G08B 13/1427 340/539.13 |
| 2009/0292464 A1* | 11/2009 | Fuchs | G06Q 10/087 701/532 |
| 2010/0188226 A1* | 7/2010 | Seder | G08B 21/0275 340/572.1 |
| 2011/0061018 A1* | 3/2011 | Piratla | G01C 21/3679 715/781 |
| 2012/0142379 A1* | 6/2012 | Park | H04M 1/72572 455/457 |
| 2012/0172062 A1* | 7/2012 | Altman | G06Q 30/0207 455/457 |
| 2012/0225633 A1* | 9/2012 | Nichols | G08B 13/1427 455/404.1 |
| 2012/0266258 A1* | 10/2012 | Tuchman | H04L 63/104 726/28 |
| 2012/0295638 A1* | 11/2012 | Yamauchi | H04M 1/7253 455/456.1 |
| 2012/0315902 A1* | 12/2012 | Nakahama | H04W 4/021 455/435.1 |
| 2012/0330600 A1* | 12/2012 | Kuo | G01S 5/0054 702/150 |
| 2013/0069782 A1* | 3/2013 | Duggal | H04W 4/02 340/539.32 |
| 2013/0165148 A1* | 6/2013 | Bahl | G01S 5/0205 455/456.2 |
| 2013/0177006 A1* | 7/2013 | Baek | H04W 4/02 370/338 |
| 2013/0178162 A1* | 7/2013 | Neumeyer | H04W 4/02 455/41.2 |
| 2013/0217333 A1* | 8/2013 | Sprigg | G06Q 30/0207 455/41.2 |
| 2013/0225205 A1* | 8/2013 | Haney | H04W 4/21 455/456.3 |
| 2013/0330055 A1* | 12/2013 | Zimmermann | G06F 16/78 386/240 |
| 2014/0084060 A1* | 3/2014 | Jain | G06Q 10/087 235/385 |
| 2014/0135042 A1* | 5/2014 | Buchheim | G01S 1/68 455/456.6 |
| 2014/0136411 A1* | 5/2014 | Cho | G06F 21/35 705/44 |
| 2014/0162701 A1* | 6/2014 | Jellinek | H04W 4/023 455/456.6 |
| 2014/0191868 A1* | 7/2014 | Ortiz | H04W 12/12 340/539.13 |
| 2014/0213301 A1* | 7/2014 | Evans | H04W 4/21 455/456.3 |
| 2014/0313035 A1* | 10/2014 | Holzapfel | G08B 13/1427 340/568.6 |
| 2014/0327518 A1* | 11/2014 | Loutit | G06Q 10/08 340/7.58 |
| 2014/0329460 A1* | 11/2014 | Loutit | G06Q 40/08 455/39 |
| 2014/0368339 A1* | 12/2014 | Thaker | G08B 21/24 340/539.32 |
| 2015/0006499 A1* | 1/2015 | Stewart | G06F 16/951 707/706 |
| 2015/0019726 A1* | 1/2015 | Zhou | H04W 48/10 709/224 |
| 2015/0072704 A1* | 3/2015 | Colby | H04W 4/023 455/456.1 |

(56) References Cited

U.S. PATENT DOCUMENTS

| | | | |
|---|---|---|---|
| 2015/0084745 A1* | 3/2015 | Hertz | H04W 4/02 340/10.3 |
| 2015/0126234 A1* | 5/2015 | Rodriguez | G08B 13/22 455/457 |
| 2015/0154851 A1* | 6/2015 | Vincent | G06F 16/9537 340/539.13 |
| 2015/0170233 A1* | 6/2015 | Lisitsa | H01L 23/427 705/26.1 |
| 2015/0185311 A1* | 7/2015 | Lohier | G06F 21/88 367/118 |
| 2016/0014545 A1* | 1/2016 | Tian | H04W 76/10 455/41.2 |
| 2016/0055353 A1* | 2/2016 | Gill | G06F 21/79 726/26 |
| 2016/0127862 A1* | 5/2016 | Beattie, Jr. | H04W 4/02 455/456.1 |
| 2016/0142876 A1* | 5/2016 | Klein | G01C 21/005 455/456.2 |
| 2016/0205502 A1* | 7/2016 | Parikh | H04W 4/02 455/456.2 |
| 2017/0168768 A1* | 6/2017 | Liu | G06F 3/14 |
| 2017/0279902 A1* | 9/2017 | Zhou | H04W 48/10 |
| 2017/0309156 A1* | 10/2017 | Thaker | G08B 21/24 |
| 2017/0316369 A1* | 11/2017 | Loutit | G06Q 10/08 |

OTHER PUBLICATIONS

Extended European Search Report dated Dec. 14, 2017 in corresponding European Patent Application No. 15882323.7, 15 pp.
International Search Report, dated Nov. 24, 2015, in International Application No. PCT/CN2015/073207 (4 pp.).

\* cited by examiner

METHOD AND SYSTEM FOR OBTAINING LOCATION INFORMATION OF TARGET OBJECT, AND APPARATUS

CROSS-REFERENCE TO RELATED APPLICATIONS

This application is a continuation of International Application No. PCT/CN2015/073207, filed on Feb. 16, 2015, the disclosure of which is hereby incorporated by reference in its entirety.

TECHNICAL FIELD

The present disclosure relates to the field of short-distance wireless communications technologies, and in particular, to a method and system for obtaining location information of a target object, and an apparatus.

BACKGROUND

In real life, object losing scenarios frequently occur. For example: when people go out for shopping or travelling, they often cannot find luggage, keys, wallets, electronic products, and some other valuables. According to incomplete statistics, people spend ten minutes a day in looking for objects. In this way, forty hours are wasted in one year. In addition to huge time costs, it brings great inconvenience to people's life.

In the prior art, searching via crowdsorcing is a hot trend of looking for objects, and an anti-loss application (App) running on a terminal can effectively search via crowdsorcing. When an object is lost, if the anti-loss application is installed on a terminal of an owner, the terminal may issue a "loss statement" in the anti-loss application, and all terminals on which the anti-loss application is running help to search for the lost object. If the lost object is found, a terminal finding the lost object sends location information of the lost object to the terminal of the owner. In this way, the owner can find the lost object conveniently. When the lost object is found by using the anti-loss application, a server of the anti-loss application controls the terminal finding the lost object to send the location information of the lost object to the terminal of the owner, but the location information of the lost object is not displayed on the terminal finding the lost object. In this way, the lost object can be prevented from being taken away by a user that owns the terminal finding the lost object.

Although an object can be found in the foregoing manner, the anti-loss application needs to be installed on other terminals that can help to search for an object. However, in actual applications, there is only a relatively small quantity of terminals that have installed the anti-loss application. Consequently, object search efficiency is relatively low.

Therefore, a current object search method has a disadvantage of relatively low search efficiency.

SUMMARY

Embodiments of the present disclosure provide a method and system for obtaining location information of a target object, and an apparatus, so as to resolve a prior-art disadvantage of relatively low search efficiency.

According to a first aspect, a method for obtaining location information of a target object is provided, including:

obtaining, by a first terminal, first location information of a target object, where the first location information is location information of a location at which the first terminal is located when a connection between the first terminal and the target object is disrupted;

selecting, by the first terminal, at least one second user from a user relationship chain of a first user according to a user selection instruction of the first user;

sending, by the first terminal, a search request to a second terminal respectively related to the at least one second user, where the search request carries an identifier of the target object and the first location information, and the search request is used to instruct the second terminal to search, according to the first location information, for the target object corresponding to the identifier of the target object; and receiving, by the first terminal, second location information returned by at least one second terminal, and determining the second location information as location information of a location at which the target object is located, where the second location information is location information of a location at which the second terminal is located when a connection between the second terminal and the target object is established.

With reference to the first aspect, in a first possible implementation manner, the user relationship chain is at least one of the following: a contact in a contact list, a user relationship chain in a communication application, or a user relationship chain in a social application.

With reference to the first aspect or the first possible implementation manner of the first aspect, in a second possible implementation manner, the sending, by the first terminal, a search request to a second terminal respectively related to the at least one second user specifically includes:

sending, by the first terminal, a first search request to a server, where the first search request carries the identifier of the target object, information about the at least one second user, and the first location information, and the first search request is used to instruct the server to send the search request to the second terminal respectively related to the at least one second user.

With reference to the first aspect or the first or the second possible implementation manners of the first aspect, in a third possible implementation manner, the receiving, by the first terminal, second location information returned by at least one second terminal specifically includes:

receiving, by the first terminal, the second location information that is presented on a map and that is returned by the at least one second terminal.

With reference to the first aspect or the first to the third possible implementation manners of the first aspect, in a fourth possible implementation manner, after the sending, by the first terminal, the search request, and before the receiving the second location information, further including:

sending, by the first terminal, voice information to the second terminal, and receiving voice information fed back by the second terminal.

According to a second aspect, a method for obtaining location information of a target object is provided, including:

receiving, by a second terminal, a search request, where the search request carries an identifier of a target object and first location information, and the first location information is location information of a location at which the first terminal is located when a connection between a first terminal and the target object is disrupted;

when determining that a distance between a location at which the second terminal is located and the location represented by the first location information is less than or equal to a first threshold, sending, by the second terminal, a first broadcast message carrying the identifier of the target object;

when detecting a second broadcast message sent by the target object, requesting, by the second terminal, to establish a connection to the target object; and after the connection to the target object is established, returning, by the second terminal, second location information to the first terminal, where the second location information is location information of a location at which the second terminal is located when the connection between the second terminal and the target object is established.

With reference to the second aspect, in a first possible implementation manner, the receiving, by a second terminal, the search request specifically includes:

receiving, by the second terminal, the search request sent by the first terminal or a server.

With reference to the second aspect or the first possible implementation manner of the second aspect, in a second possible implementation manner, after the determining, by the second terminal, that a distance between a location at which the second terminal is located and the location represented by the first location information is less than or equal to a first threshold, and before the sending the first broadcast message, the method further includes:

displaying, by the second terminal on a screen in real time, the location at which the second terminal is currently located, the location represented by the first location information, and the distance between the location at which the second terminal is currently located and the location represented by the first location information.

With reference to the second possible implementation manner of the second aspect, in a third possible implementation manner, after the presenting, by the second terminal, the location at which the second terminal is currently located, the location represented by the first location information, and the distance, the method further includes:

if the distance between the location at which the second terminal is currently located and the location represented by the first location information is greater than a second threshold, displaying, by the second terminal on the screen, an operational option that triggers sending of the first broadcast message, where the first threshold is greater than the second threshold; and the sending, by the second terminal, a first broadcast message carrying the identifier of the target object specifically includes:

when the second terminal detects that the operational option is triggered, sending, by the second terminal, the first broadcast message.

With reference to the second possible implementation manner of the second aspect, in a fourth possible implementation manner, if the distance between the location at which the second terminal is currently located and the location represented by the first location information is less than or equal to a second threshold, where the first threshold is greater than the second threshold, the sending, by the second terminal, a first broadcast message carrying the identifier of the target object specifically includes:

sending, by the second terminal, the broadcast message directly.

With reference to the second aspect or the first to the fourth possible implementation manners of the second aspect, in a fifth possible implementation manner, the returning, by the second terminal, the second location information to the first terminal specifically includes:

returning, by the second terminal, the second location information presented on a map to the first terminal.

With reference to the second aspect or the first to the fifth possible implementation manners of the second aspect, in a sixth possible implementation manner, before the returning, by the second terminal, the second location information to the first terminal, the method further includes:

receiving, by the second terminal, voice information sent by the first terminal, and feeding back voice information to the first terminal.

According to a third aspect, a method for obtaining location information of a target object is provided, including:

obtaining, by a first terminal, first location information of a target object, where the first location information is location information of a location at which the first terminal is located when a connection between the first terminal and the target object is disrupted;

sending, by the first terminal, a first search request to a server, where the first search request carries an identifier of the target object, the first location information, and a stranger access rights information credential, and the stranger access rights information credential is used to instruct a second terminal to disrupt a connection to the target object after the second terminal returns second location information to the first terminal; and the first search request is used to instruct the server to send a second search request to at least one second terminal, the second terminal is a terminal whose distance to the location represented by the first location information is less than or equal to a preset distance, the second search request carries the identifier of the target object and the stranger access rights information credential, and the second search request is used to instruct the at least one second terminal to search for the target object corresponding to the identifier of the target object; and receiving, by the first terminal, the second location information returned by the at least one second terminal, and determining the second location information as location information of a location at which the target object is located, where the second location information is location information of a location at which the second terminal is located when a connection between the second terminal and the target object is established.

With reference to the third aspect, in a first possible implementation manner, the receiving, by the first terminal, the second location information returned by the at least one second terminal specifically includes:

receiving, by the first terminal, the second location information that is presented on a map and that is returned by the at least one second terminal.

According to a fourth aspect, a method for obtaining location information of a target object is provided, including:

receiving, by a second terminal, a second search request sent by a server, where the second search request carries an identifier of a target object and a stranger access rights information credential;

sending, by the second terminal, a first broadcast message carrying the identifier of the target object, and when detecting a second broadcast message sent by the target object, requesting to establish a connection to the target object;

when the connection to the target object is established, returning, by the second terminal, second location information to the first terminal, where the second location information is location information of a location at which the second terminal is located when the connection between the second terminal and the target object is established; and after returning the second location information to the first terminal according to the stranger access rights information credential, disrupting, by the second terminal, the connection to the target object.

With reference to the fourth aspect, in a first possible implementation manner, after the returning, by the second terminal, the second location information to the first terminal, the method further includes:

sending, by the second terminal, a notification message to the target object, where the notification message is used to notify the target object that the second terminal already sends the second location information to the first terminal; and sending, by the second terminal, the stranger access rights information credential to the target object, so that after receiving the notification message, the target object disrupts the connection to the second terminal according to the stranger access rights information credential.

With reference to the fourth aspect or the first possible implementation manner of the fourth aspect, in a second possible implementation manner, the returning, by the second terminal, the second location information to the first terminal specifically includes:

returning, by the second terminal, the second location information presented on a map to the first terminal.

According to a fifth aspect, a first terminal is provided, including:

an obtaining unit, configured to obtain first location information of a target object, where the first location information is location information of a location at which the first terminal is located when a connection between the first terminal and the target object is disrupted;

a selection unit, configured to select at least one second user from a user relationship chain of a first user according to a user selection instruction of the first user;

a sending unit, configured to send a search request to a second terminal respectively related to the at least one second user, where the search request carries an identifier of the target object and the first location information, and the search request is used to instruct the second terminal to search, according to the first location information, for the target object corresponding to the identifier of the target object; and a receiving unit, configured to receive second location information returned by at least one second terminal, and determine the second location information as location information of a location at which the target object is located, where the second location information is location information of a location at which the second terminal is located when a connection between the second terminal and the target object is established.

With reference to the fifth aspect, in a first possible implementation manner, the user relationship chain is at least one of the following: a contact in a contact list, a user relationship chain in a communication application, or a user relationship chain in a social application.

With reference to the fifth aspect or the first possible implementation manner of the fifth aspect, in a second possible implementation manner, the sending unit is further configured to: send a first search request to a server, where the first search request carries the identifier of the target object, information about the at least one second user, and the first location information, and the first search request is used to instruct the server to send the search request to the second terminal respectively related to the at least one second user.

With reference to the fifth aspect or the first or the second possible implementation manner of the fifth aspect, in a third possible implementation manner, the receiving unit is specifically configured to:

receive the second location information that is presented on a map and that is returned by the at least one second terminal.

With reference to the fifth aspect or the first to the third possible implementation manners of the fifth aspect, in a fourth possible implementation manner, the sending unit is further configured to send voice information to the second terminal; and the receiving unit is further configured to receive voice information fed back by the second terminal.

According to a sixth aspect, a second terminal is provided, including:

a receiving unit, configured to receive a search request, where the search request carries an identifier of a target object and first location information, and the first location information is location information of a location at which the first terminal is located when a connection between a first terminal and the target object is disrupted;

a sending unit, configured to: when it is determined that a distance between a location at which the terminal is located and the location represented by the first location information is less than or equal to a first threshold, send a first broadcast message carrying the identifier of the target object; and a request unit, configured to: when a second broadcast message sent by the target object is detected, request to establish a connection to the target object, where the sending unit is further configured to: after the connection to the target object is established, return second location information to the first terminal, where the second location information is location information of a location at which the terminal is located when the connection between the terminal and the target object is established.

With reference to the sixth aspect, in a first possible implementation manner, the receiving unit is specifically configured to:

receive the search request sent by the first terminal or a server.

With reference to the sixth aspect or the first possible implementation manner of the sixth aspect, in a second possible implementation manner, the second terminal further includes a display unit, and the display unit is configured to:

display, on a screen in real time, the location at which the second terminal is currently located, the location represented by the first location information, and the distance between the location at which the second terminal is currently located and the location represented by the first location information.

With reference to the second possible implementation manner of the sixth aspect, in a third possible implementation manner, if the distance between the location at which the second terminal is currently located and the location represented by the first location information is greater than a second threshold, the display unit displays, on the screen, an operational option that triggers sending of the first broadcast message, where the first threshold is greater than the second threshold; and the sending unit is further configured to:

when the display unit detects that the operational option is triggered, send the first broadcast message.

With reference to the second possible implementation manner of the sixth aspect, in a fourth possible implementation manner, if the distance between the location at which the terminal is currently located and the location represented by the first location information is less than or equal to a second threshold, where the first threshold is greater than the second threshold, the sending unit is specifically configured to send the broadcast message directly.

With reference to the sixth aspect or the first to the fourth possible implementation manners of the sixth aspect, in a fifth possible implementation manner, the sending unit is specifically configured to:

return the second location information presented on a map to the first terminal.

With reference to the sixth aspect or the first to the fifth possible implementation manners of the sixth aspect, in a sixth possible implementation manner, the receiving unit is further configured to receive voice information sent by the first terminal; and the sending unit is further configured to feed back voice information to the first terminal.

According to a seventh aspect, a first terminal is provided, including:

an obtaining unit, configured to obtain first location information of a target object, where the first location information is location information of a location at which the first terminal is located when a connection between the first terminal and the target object is disrupted;

a sending unit, configured to: send a first search request to a server, where the first search request carries an identifier of the target object, the first location information, and a stranger access rights information credential, and the stranger access rights information credential is used to instruct a second terminal to disrupt a connection to the target object after the second terminal returns second location information to the first terminal; and the first search request is used to instruct the server to send a second search request to at least one second terminal, the second terminal is a terminal whose distance to the location represented by the first location information is less than or equal to a preset distance, the second search request carries the identifier of the target object and the stranger access rights information credential, and the second search request is used to instruct the at least one second terminal to search for the target object corresponding to the identifier of the target object; and a receiving unit, configured to receive the second location information returned by the at least one second terminal, and determine the second location information as location information of a location at which the target object is located, where the second location information is location information of a location at which the second terminal is located when a connection between the second terminal and the target object is established.

With reference to the seventh aspect, in a first possible implementation manner, the receiving unit is specifically configured to:

receive the second location information that is presented on a map and that is returned by the at least one second terminal.

According to an eighth aspect, a second terminal is provided, including:

a receiving unit, configured to receive a second search request sent by a server, where the second search request carries an identifier of a target object and a stranger access rights information credential;

a sending unit, configured to send a first broadcast message carrying the identifier of the target object;

a request unit, configured to: when a second broadcast message sent by the target object is detected, request to establish a connection to the target object, where the sending unit is further configured to: when the connection to the target object is established, return second location information to the first terminal, where the second location information is location information of a location at which the second terminal is located when the connection between the second terminal and the target object is established; and a disruption unit, configured to: after the second location information is returned to the first terminal according to the stranger access rights information credential, disrupt the connection to the target object.

With reference to the eighth aspect, in a first possible implementation manner, the sending unit is further configured to:

send a notification message to the target object, where the notification message is used to notify the target object that the second terminal already sends the second location information to the first terminal; and send the stranger access rights information credential to the target object, so that after receiving the notification message, the target object disrupts the connection to the second terminal according to the stranger access rights information credential.

With reference to the eighth aspect or the first possible implementation manner of the eighth aspect, in a second possible implementation manner, the receiving unit is further configured to:

return the second location information presented on a map to the first terminal.

According to a ninth aspect, a system for obtaining location information of a target object is provided, including the first terminal according to any one of the fifth aspect or the first to the fourth possible implementation manners of the fifth aspect, and the second terminal according to any one of the sixth aspect or the first to the sixth possible implementation manners of the sixth aspect; or including the first terminal according to either of the seventh aspect or the first possible implementation manner of the seventh aspect, and the second terminal according to any one of the eighth aspect or the first and the second possible implementation manners of the eighth aspect.

In the prior art, when searching for an object, a terminal can search for the object by using only another terminal on which an anti-loss application is installed, which therefore results in a disadvantage of relatively low object search efficiency. In the embodiments of the present disclosure, in a solution of obtaining location information of a target object, at least one second user is selected from a user relationship chain of a first user, and the location information of the target object is obtained by using a second terminal related to the second user. In another solution of obtaining location information of a target object, the location information of the target object is obtained by using a second terminal whose distance to a location represented by first location information is less than or equal to a preset distance. In these two solutions, an anti-loss application needs to be installed on none of terminals helping to obtain location information of a target object. Therefore, object search efficiency is improved.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Example implementation manners of the present disclosure are described in detail below with reference to the accompanying drawings of this specification. It should be understood that the example embodiments described herein are merely used to describe and explain the present disclosure, but are not intended to limit the present disclosure. In addition, the embodiments of this application and features in the embodiments may be mutually combined when they do not conflict with each other.

Optionally, the present disclosure may be applied to a scenario of losing an object, a child, or a pet in a public place, and the public place may be a school, a work place, an airport, a station, a shopping mall, or the like.

The following describes example implementation manners of the present disclosure in detail with reference to accompanying drawings.

Figure 1A:
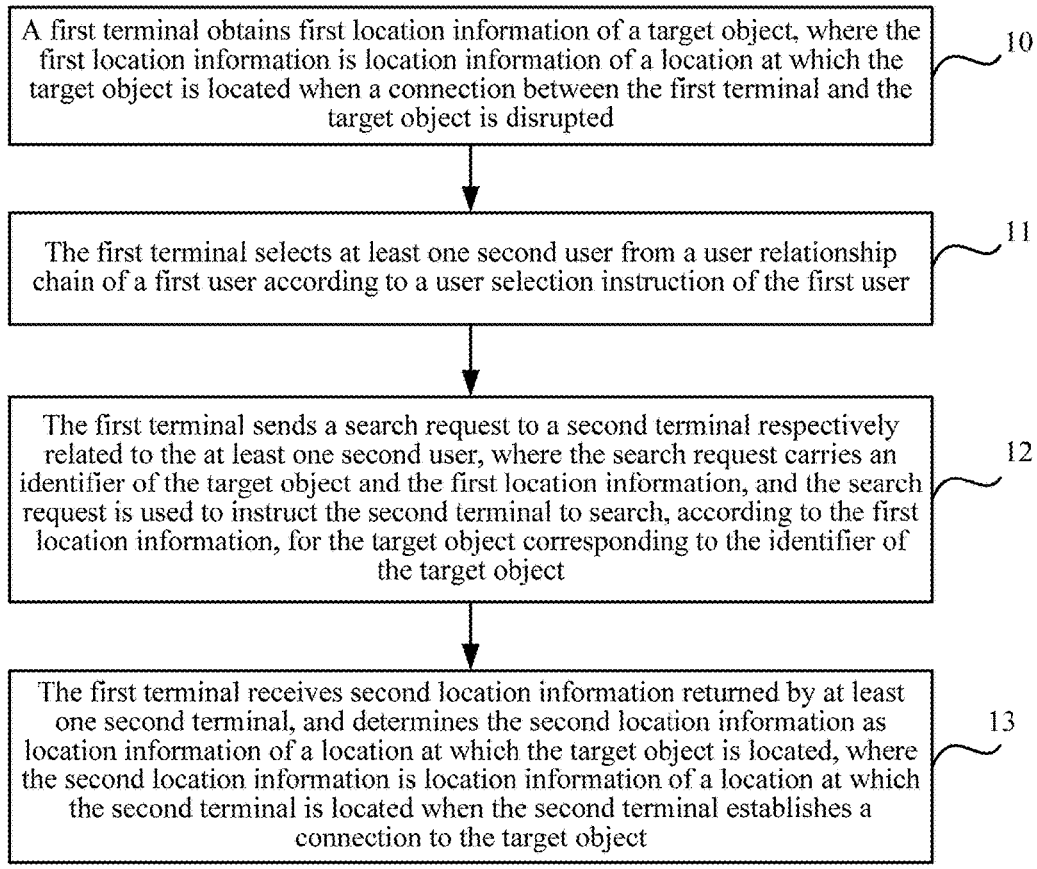
FIG. 1A is a flowchart of obtaining location information of a target object according to an embodiment of the present disclosure.

Referring to FIG. 1A, in an embodiment of the present disclosure, a procedure of obtaining location information of a target object is as follows:

Step 10: A first terminal obtains first location information of a target object, where the first location information is location information of a location at which the first terminal is located when a connection between the first terminal and the target object is disrupted.

Step 11: The first terminal selects at least one second user from a user relationship chain of a first user according to a user selection instruction of the first user.

Step 12: The first terminal sends a search request to a second terminal respectively related to the at least one second user, where the search request carries an identifier of the target object and the first location information, and the search request is used to instruct the second terminal to search, according to the first location information, for the target object corresponding to the identifier of the target object.

Step 13: The first terminal receives second location information returned by at least one second terminal, and determines the second location information as location information of a location at which the target object is located, where the second location information is location information of a location at which the second terminal is located when a connection between the second terminal and the target object is established.

In this embodiment of the present disclosure, the target object may be a wearable device or an object with a smart label. Optionally, the wearable device may be a smart watch, a smart band, or the like, and the smart label refers to an electronic label with a short-distance communication capability. The wearable device and the smart label are technologies known in the communications field, and therefore, are not described in detail herein one by one.

Figure 1B:
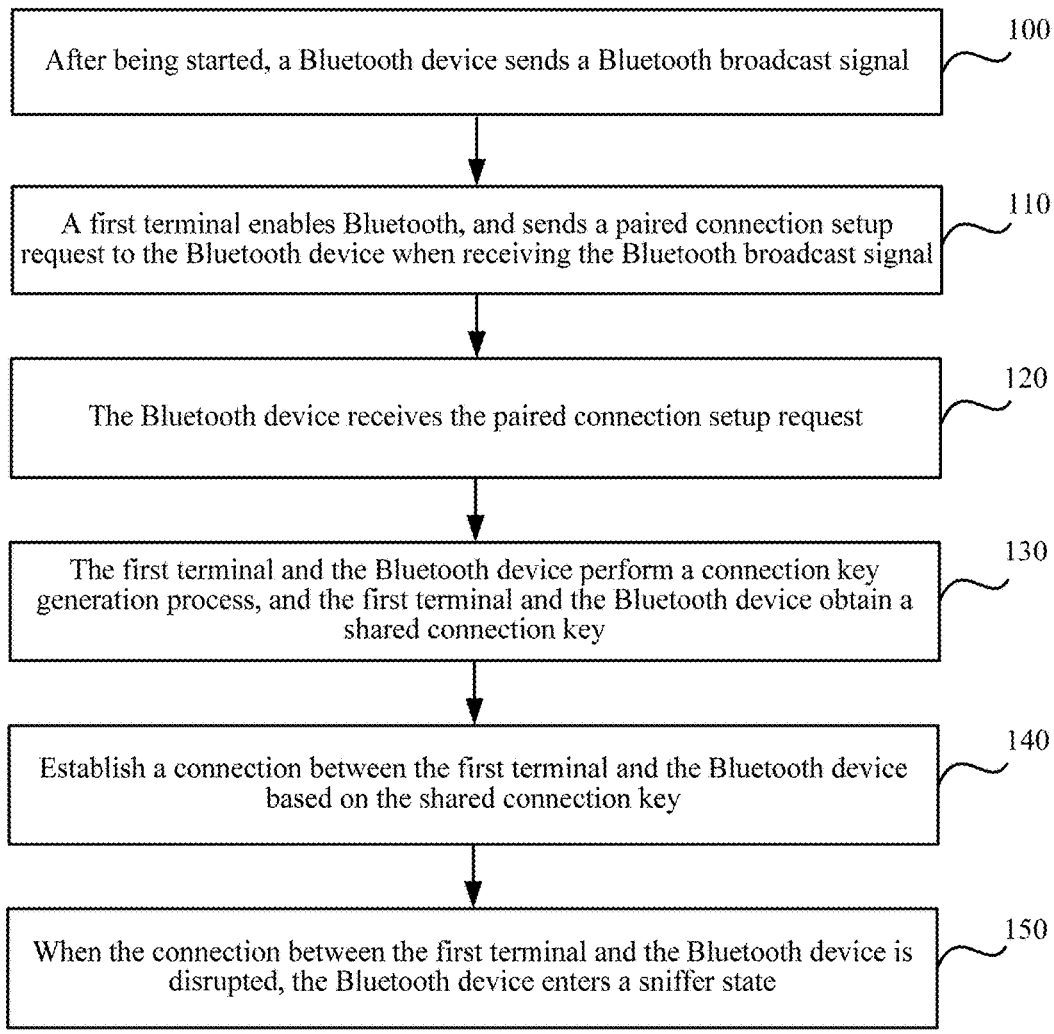
FIG. 1B is a flowchart of starting sniffer according to an embodiment of the present disclosure.

In this embodiment of the present disclosure, before the first terminal obtains the location information of the target object, the target object needs to be set so that sniffer is started after the connection between the target object and the first terminal is disrupted. That is, before the first terminal loses the target object, the target object needs to be set so that sniffer is started after the connection to the first terminal is disrupted. A specific process is shown in FIG. 1B, and a description is provided below by using an example in which a target object is a Bluetooth device.

Step 100: After being started, a Bluetooth device sends a Bluetooth broadcast signal.

The Bluetooth broadcast signal includes identifier (ID) information of the Bluetooth device.

Step 110: A first terminal enables Bluetooth, and sends a paired connection setup request to the Bluetooth device when receiving the Bluetooth broadcast signal.

Step 120: The Bluetooth device receives the paired connection setup request.

Step 130: The first terminal and the Bluetooth device perform a connection key generation process, and the first terminal and the Bluetooth device obtain a shared connection key.

Step 140: Establish a connection between the first terminal and the Bluetooth device based on the shared connection key.

Step 150: When the connection between the first terminal and the Bluetooth device is disrupted, the Bluetooth device enters a sniffer state.

In this embodiment of the present disclosure, a terminal that first establishes a connection to the Bluetooth device is set to a terminal having the primary permission. If the terminal having the primary permission sends the shared connection key and the ID information of the Bluetooth device to another terminal, the another terminal may also establish a connection to the Bluetooth device.

In this embodiment of the present disclosure, the Bluetooth device needs to be activated before the Bluetooth device is enabled, and there are multiple manners for activating the Bluetooth device. A password is preset for the Bluetooth device before delivery from a factory, and the preset password may be a mixed sequence of a string of characters and figures, and is printed in a specification of the product. A user activates the Bluetooth device according to the preset password.

In this embodiment of the present disclosure, the first location information may be information of the location at which the target object is located when the connection between the first terminal and the target object is disrupted. When obtaining the first location information, the first terminal may obtain the first location information by using a Global Positioning System (GPS) technology or a Wireless Fidelity (Wi-Fi) technology, or by means of collaborative positioning.

Figure 1C:
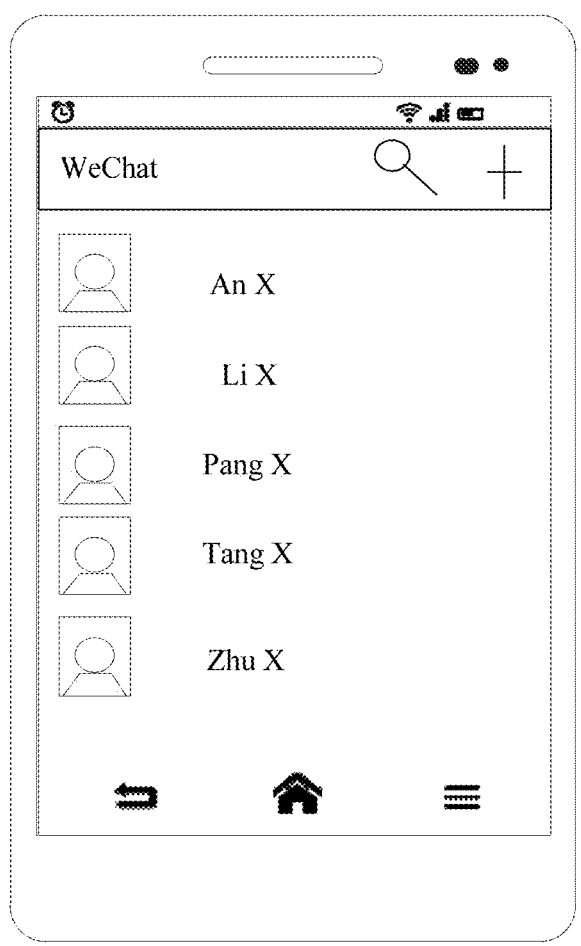
FIG. 1C is a schematic diagram of a user relationship chain according to an embodiment of the present disclosure.

In this embodiment of the present disclosure, optionally, the user relationship chain is at least one of a contact in a contact list, a user relationship chain in a communication application, or a user relationship chain in a social application. For example, a user relationship chain in a communication application may be WeChat friends (as shown in FIG. 1C), QQ friends, MSN Microsoft Service Network (MSN) friends, Line friends, or WhatsApp friends; and a user relationship chain in a social application may be Facebook friends, or Twitter friends.

In this embodiment of the present disclosure, optionally, the first terminal sends the search request to the second terminal respectively related to the at least one second user by using the following manner:

sending, by the first terminal, a first search request to a server, where the first search request carries the identifier of the target object, information about the at least one second user, and the first location information, and the first search request is used to instruct the server to send the search request to the second terminal respectively related to the at least one second user.

That is, the search request may be directly sent by the first terminal to the second terminal, or may be sent by the server. Certainly, implementation manners are not limited to the foregoing two manners, and are not described in detail herein one by one.

In this embodiment of the present disclosure, optionally, the first terminal may receive the second location information returned by at least one second terminal by using the following manner:

receiving, by the first terminal, the second location information that is presented on a map and that is returned by the at least one second terminal.

Figure 1D:
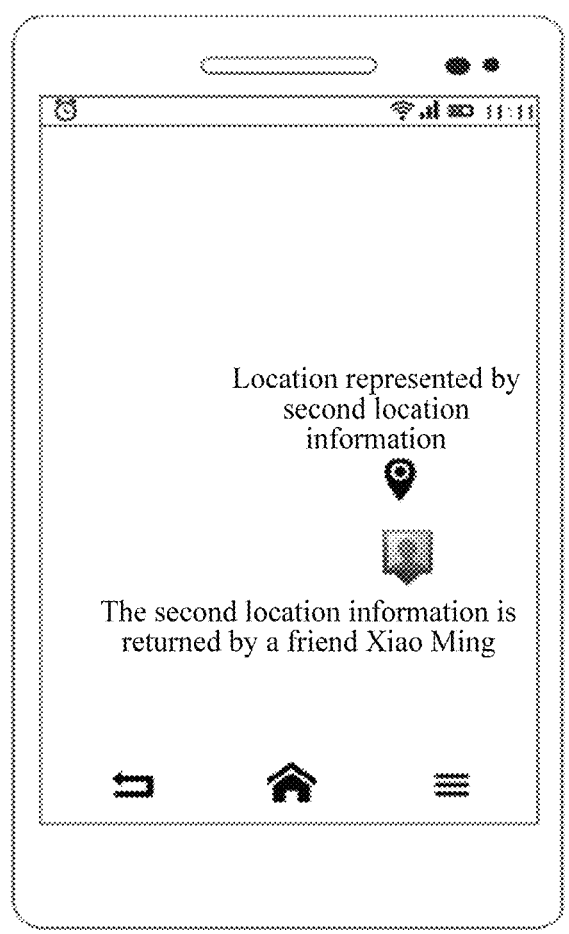
FIG. 1D is a schematic diagram of returning second location information by a second terminal according to an embodiment of the present disclosure.

For example: Xiao Zhang lost a necklace, and the necklace is labeled with a smart label. Then, Xiao Zhang looks for the necklace with the help of WeChat friends. After a terminal of a WeChat friend Xiao Ming establishes a connection to the smart label, Xiao Ming returns current location information (that is, the second location information in step 13) of Xiao Ming to the terminal (that is, the first terminal described in step 10) of Xiao Zhang, as shown in FIG. 1D.

In the foregoing, the second location information is presented on a map. Certainly, the second location information may also be presented in a form of a short message, or the second location information may be presented in a form of voice information.

In this embodiment of the present disclosure, the first terminal selects multiple second users. However, the second location information may be returned by all second terminals of second terminals related to the selected second users, or the second location information may be returned by some second terminals of second terminals related to the selected second users, or the second location information may be returned by none of second terminals related to the selected second users.

For example: ten second users are selected, and have ten second terminals in total. The second location information may be returned by the ten second terminals, or the second location information may be returned by five second terminals, or the second location information may be returned by none of the second terminals.

In this embodiment of the present disclosure, further, to improve search efficiency, after the sending, by the first terminal, a search request, and before the receiving second location information, the following operation is further included:

sending, by the first terminal, voice information to the second terminal, and receiving voice information fed back by the second terminal.

For example, a user owning the first terminal went to a supermarket A, a park B, and a bookstore C. The first terminal sends voice information "Search around the supermarket A" to the second terminal, and the second terminal returns voice information "Not found around the supermarket A". The first terminal sends voice information "Search around the park B" to the second terminal, and the second terminal returns voice information "Not found around the park B". The first terminal sends voice information "Search around the bookstore C" to the second terminal, and the second terminal returns voice information "Found at the bookstore C". In this way, the second terminal may quickly find the target object.

In this embodiment of the present disclosure, the first location information may be specific coordinates. Because some target objects are moving, or a target object is lost in a moving device, a location of the target object changes. In this case, even if the first terminal may obtain specific coordinates of the target object when the first terminal is disconnected from the target object the location information of the target object still needs to be obtained because the location of the target object changes.

Certainly, the first location information may also not be specific coordinates, but a location range, such as "Madian" or "Shangdi". In this case, because the first location information is a relatively large coverage, the location information of the target object, that is, the second location information still needs to be obtained. A coverage of the obtained second location information is smaller than the coverage of the first location information. Therefore, the obtained second location information is useful.

For example, the first terminal determines that the first location information is "Madian", but "Madian" is a relatively large coverage. Therefore, the first user owning the first terminal asks WeChat friends around "Madian" of WeChat friends to help to look for the target object. After a WeChat friend 1 finds the target object, a second terminal of the WeChat friend 1 returns a location "a hall of a north ring center building" at which the WeChat friend 1 is located to the first terminal. The first user determines that the target object is lost in the hall of the north ring center building.

In this embodiment of the present disclosure, a process of establishing a connection between the second terminal and the target object is as follows:

Step A: The second terminal sends a first broadcast message carrying the identifier of the target object.

Step B: After detecting the first broadcast message, and determining that the identifier of the target object carried in the first broadcast message is an identifier of this target object, the target object sends, to the second terminal, a second broadcast message carrying the identifier of the target object.

Step C: After detecting the second broadcast message, the second terminal sends a connection setup request to the target object, to request to establish a connection to the target object.

Step D: After receiving the connection setup request, the target object establishes a connection to the second terminal.

Further, to improve security, after the target object establishes the connection to the second terminal, two-way authentication needs to be performed between the target object and the second terminal. The second terminal returns the second location information to the first terminal only after the two-way authentication succeeds.

A process of helping to search for an object by the second terminal owned by the second user in the user relationship chain are described in Step 10 to step 13. Certainly, in actual applications, the second terminal may be a terminal sharing a screen with the first terminal, or may be a terminal that can perform point-to-point communication with the first terminal, which is not described in detail herein one by one.

Figure 2A:
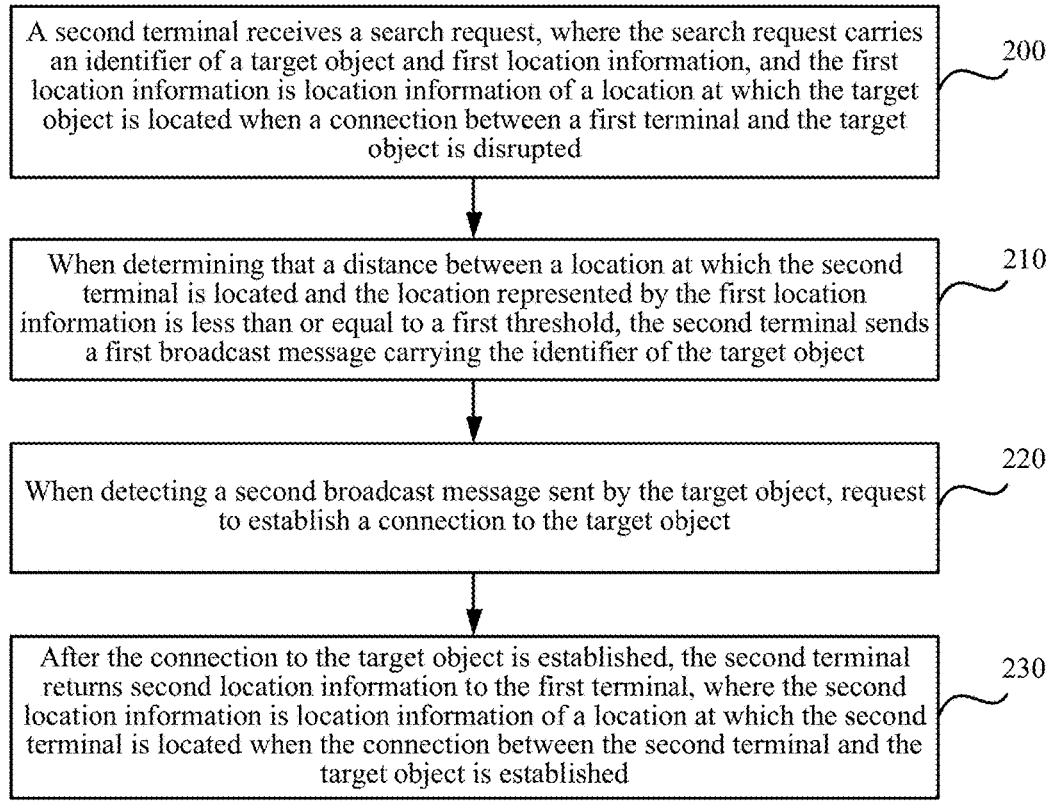
FIG. 2A is another flowchart of obtaining location information of a target object according to an embodiment of the present disclosure.

Referring to FIG. 2A, in an embodiment of the present disclosure, another procedure of obtaining location information of a target object is as follows:

Step 200: A second terminal receives a search request, where the search request carries an identifier of a target object and first location information, and the first location information is location information of a location at which the first terminal is located when a connection between a first terminal and the target object is disrupted.

Step 210: When determining that a distance between a location at which the second terminal is located and the location represented by the first location information is less than or equal to a first threshold, the second terminal sends a first broadcast message carrying the identifier of the target object.

Step 220: When detecting a second broadcast message sent by the target object, request to establish a connection to the target object.

Step 230: After the connection to the target object is established, the second terminal returns second location information to the first terminal, where the second location information is location information of a location at which the second terminal is located when the connection between the second terminal and the target object is established.

In this embodiment of the present disclosure, optionally, the second terminal may receive the search request by using the following manner:

receiving, by the second terminal, the search request sent by the first terminal or a server.

Certainly, implementation manners are not limited to the foregoing two manners, and are not described in detail herein one by one.

Figure 2B:
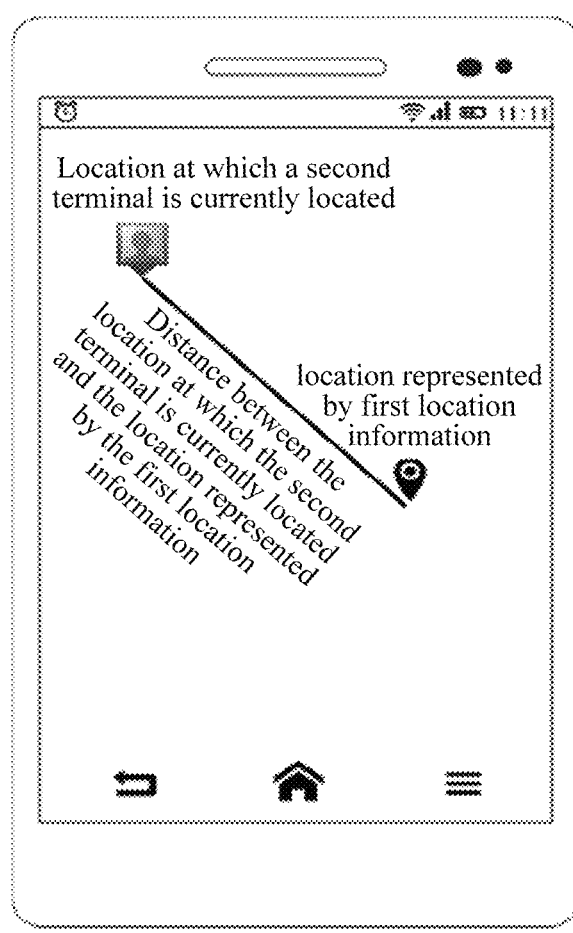
FIG. 2B is a schematic diagram of presenting information by a second terminal according to an embodiment of the present disclosure.

In this embodiment of the present disclosure, further, to improve search efficiency, after the determining, by the second terminal, that a distance between a location at which the second terminal is located and the location represented by the first location information is less than or equal to a preset distance, and before the sending a first broadcast message, the following operation is further included:

displaying, by the second terminal on a screen in real time, the location at which the second terminal is currently located, the location represented by the first location information, and the distance between the location at which the second terminal is currently located and the location represented by the first location information, as shown in FIG. 2B.

In this embodiment of the present disclosure, to reduce power consumption of the second terminal, after the displaying, by the second terminal on a screen in real time, the location at which the second terminal is currently located, the location represented by the first location information, and a distance, the following operation is further included:

if the distance between the location at which the second terminal is located and the location represented by the first location information is greater than a second threshold, displaying, by the second terminal on the screen, an operational option that triggers sending of the first broadcast message, where the first threshold is greater than the second threshold.

In this case, the second terminal may send the first broadcast message carrying the identifier of the target object by using the following manner:

when detecting that the operational option is triggered, sending, by the second terminal, the first broadcast message.

In this way, the second terminal does not need to send the first broadcast message when the second terminal is very far away from the target object. Therefore, the power consumption of the second terminal is reduced.

Alternatively, further, if the distance between the location at which the second terminal is currently located and the location represented by the first location information is less than or equal to a second threshold, where the first threshold is greater than the second threshold, optionally, the second terminal may send the first broadcast message carrying the identifier of the target object by using the following manner:

sending, by the second terminal, the first broadcast message directly.

That is, if the distance between the location at which the second terminal is located and the location represented by the first location information is greater than the second threshold, the second terminal displays, on the screen, the operational option that triggers sending of the first broadcast message rather than sending the first broadcast message immediately, and sends the first broadcast message only when the second terminal detects that the operational option is triggered. If the distance between the location at which the second terminal is located and the location represented by the first location information is less than or equal to the second threshold, where the first threshold is greater than the second threshold, the second terminal sends the first broadcast message directly.

For example, the first threshold is 2000 meters, and the second threshold is 500 meters. When the distance between the location at which the second terminal is currently located and the location represented by the first location information is 1000 meters, the second terminal may not send the first broadcast message. If a user clicks the operational option, even if the distance between the location at which the second terminal is currently located and the location represented by the first location information is greater than 500 meters, the second terminal may send the first broadcast message. If the operational option is not triggered, the second terminal does not send the first broadcast message when the distance between the second terminal and the location represented by the first location information is greater than 500 meters. However, when the distance between the second terminal and the location represented by the first location information is less than or equal to 500 meters, the second terminal directly sends the first broadcast message.

In this embodiment of the present disclosure, there are multiple manners for returning the second location information to the first terminal by the second terminal. Optionally, the following manner may be used:

returning, by the second terminal, the second location information presented on a map to the first terminal.

Alternatively, the second location information may be presented in a form of voice. Certainly, other manners may be used, and are not described in detail herein one by one.

In this embodiment of the present disclosure, to improve search efficiency, before the returning, by the second terminal, second location information to the first terminal, the following operation may also be included:

receiving, by the second terminal, voice information sent by the first terminal, and feeding back voice information to the first terminal.

Figure 2C:
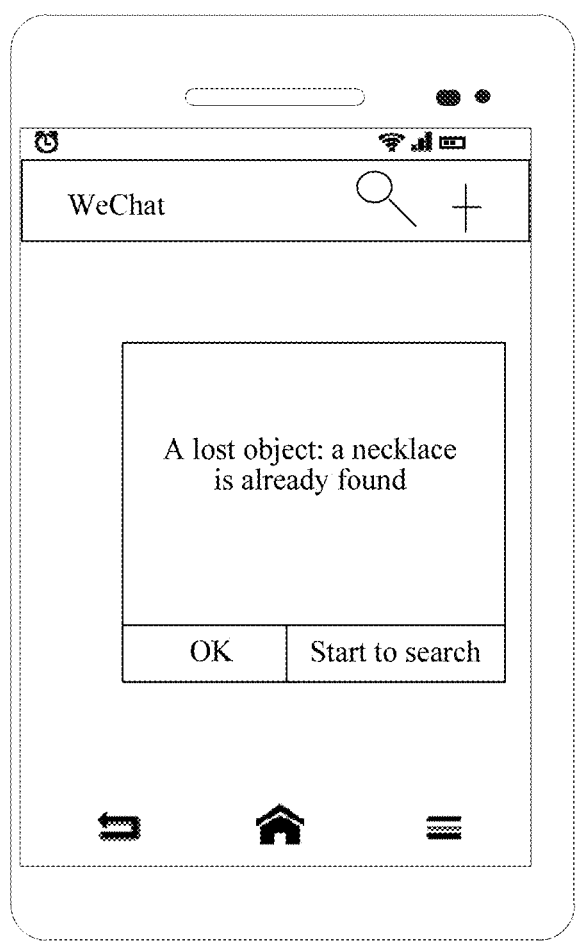
FIG. 2C is a schematic diagram of an interface of a second terminal finding a target object according to an embodiment of the present disclosure.

In this embodiment of the present disclosure, after the second terminal finds the target object, an interface of the second terminal may be shown in FIG. 2C.

In this embodiment of the present disclosure, a process of establishing a connection between the second terminal and the target object is as follows:

Step A: The second terminal sends the first broadcast message carrying the identifier of the target object.

Step B: After detecting the first broadcast message, and determining that the identifier of the target object carried in the first broadcast message is an identifier of this target object, the target object sends, to the second terminal, the second broadcast message carrying the identifier of the target object.

Step C: After detecting the second broadcast message, the second terminal sends a connection setup request to the target object, to request to establish a connection to the target object.

Step D: After receiving the connection setup request, the target object establishes a connection to the second terminal.

Further, to improve security, after the target object establishes the connection to the second terminal, two-way authentication needs to be performed between the target object and the second terminal. The second terminal returns the second location information to the first terminal only after the two-way authentication succeeds.

Figure 3:
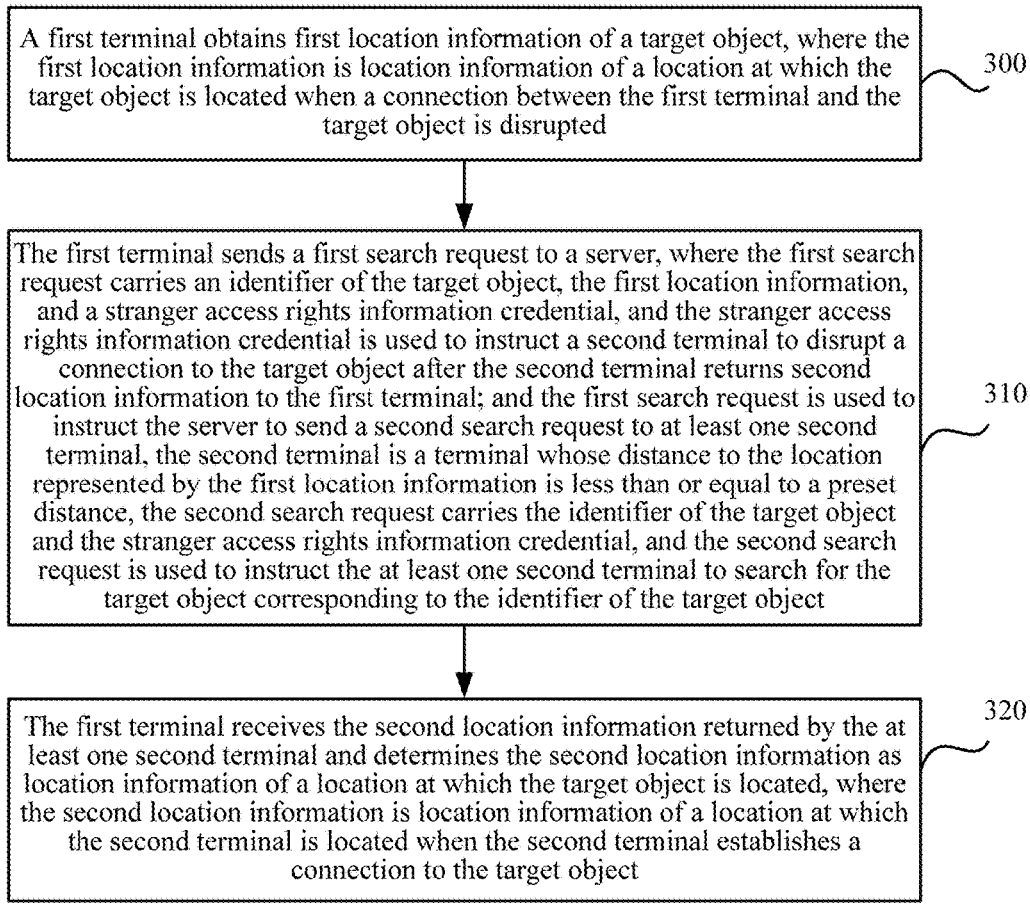
FIG. 3 is another flowchart of obtaining location information of a target object according to an embodiment of the present disclosure.

The foregoing describes a process of searching for an object by a second terminal of a user in a user relationship chain. However, in actual applications, an object may also be looked for by a non-friend. However, in the prior art, during object search with the help of a non-friend, a second terminal owned by the non-friend does not disrupt a connection to the target object after finding a target object. In this way, there is a relatively high probability that the target object is taken away by the non-friend, and the target object is lost again. To prevent the target object from being lost again, in this embodiment of the present disclosure, a method for obtaining location information of a target object is provided as follows:

Referring to FIG. 3, in an embodiment of the present disclosure, another procedure of obtaining location information of a target object is as follows:

Step 300: A first terminal obtains first location information of a target object, where the first location information is location information of a location at which the first terminal is located when a connection between the first terminal and the target object is disrupted.

Step 310: The first terminal sends a first search request to a server, where the first search request carries an identifier of the target object, the first location information, and a stranger access rights information credential, and the stranger access rights information credential is used to instruct a second terminal to disrupt a connection to the target object after the second terminal returns second location information to the first terminal; and the first search request is used to instruct the server to send a second search request to at least one second terminal, the second terminal is a terminal whose distance to the location represented by the first location information is less than or equal to a preset distance, the second search request carries the identifier of the target object and the stranger access rights information credential, and the second search request is used to instruct the at least one second terminal to search for the target object corresponding to the identifier of the target object.

Step 320: The first terminal receives the second location information returned by the at least one second terminal and determines the second location information as location information of a location at which the target object is located, where the second location information is location information of a location at which the second terminal is located when a connection between the second terminal and the target object is established. In this way, after finding the target object, the second terminal disrupts the connection to the target object, preventing the target object from being lost again.

In this embodiment of the present disclosure, there are multiple manners for receiving, by the first terminal, the second location information returned by the at least one second terminal. Optionally, the following manner may be used:

receiving, by the first terminal, the second location information that is presented on a map and that is returned by the at least one second terminal.

In this embodiment of the present disclosure, a process of establishing a connection between the second terminal and the target object is as follows:

Step A: The second terminal sends a first broadcast message carrying the identifier of the target object.

Step B: After detecting the first broadcast message, and determining that the identifier of the target object carried in the first broadcast message is an identifier of this target object, the target object sends, to the second terminal, a second broadcast message carrying the identifier of the target object.

Step C: After detecting the second broadcast message, the second terminal sends a connection setup request to the target object, to request to establish a connection to the target object.

Step D: After receiving the connection setup request, the target object establishes a connection to the second terminal.

Further, to improve security, after the target object establishes the connection to the second terminal, two-way authentication needs to be performed between the target object and the second terminal. The second terminal returns the second location information to the first terminal only after the two-way authentication succeeds.

Figure 4:
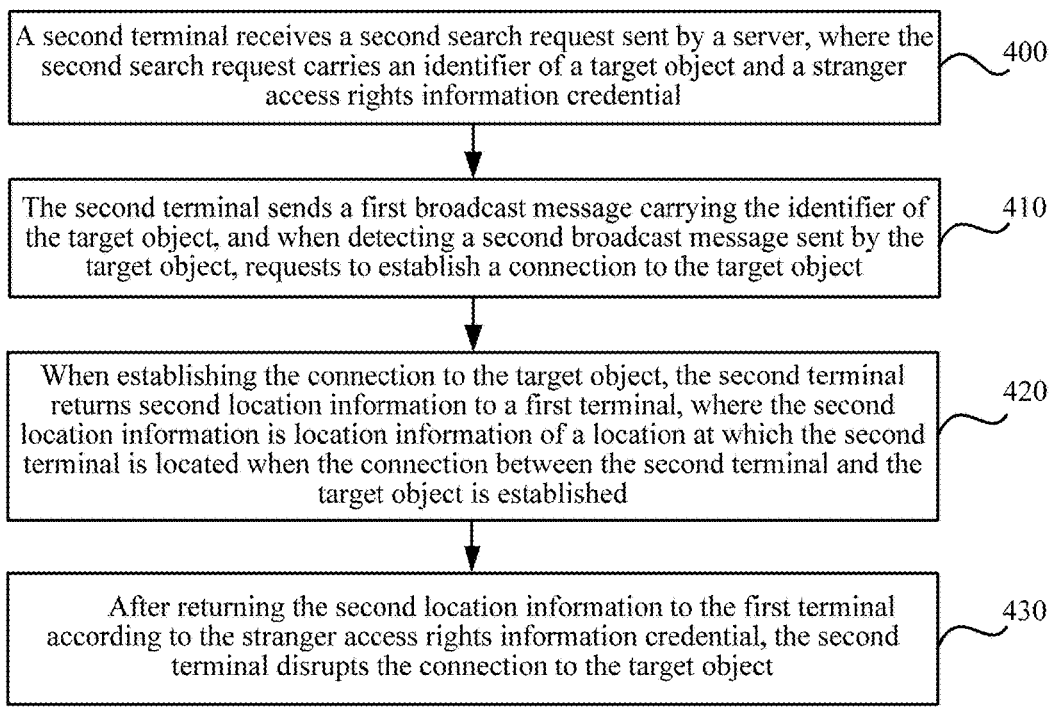
FIG. 4 is another flowchart of obtaining location information of a target object according to an embodiment of the present disclosure.

Referring to FIG. 4, in an embodiment of the present disclosure, another procedure of obtaining location information of a target object is as follows:

Step 400: A second terminal receives a second search request sent by a server, where the second search request carries an identifier of a target object and a stranger access rights information credential.

Step 410: The second terminal sends a first broadcast message carrying the identifier of the target object, and when detecting a second broadcast message sent by the target object, requests to establish a connection to the target object.

Step 420: When the connection to the target object is established, the second terminal returns second location information to a first terminal, where the second location information is location information of a location at which the second terminal is located when the connection between the second terminal and the target object is established.

Step 430: After returning the second location information to the first terminal according to the stranger access rights information credential, the second terminal disrupts the connection to the target object.

In the foregoing, after the second terminal establishes the connection to the target object, and returns the second location information to the first terminal, the second terminal actively disrupts the connection to the target object. Certainly, the target object may also actively disrupt the connection to the second terminal. Therefore, after the returning, by the second terminal, second location information to the first terminal, the following operation is further included:

sending, by the second terminal, a notification message to the target object, where the notification message is used to notify the target object that the second terminal already sends the second location information to the first terminal; and sending, by the second terminal, the stranger access rights information credential to the target object, so that after receiving the notification message, the target object disrupts the connection to the second terminal according to the stranger access rights information credential.

In this embodiment of the present disclosure, optionally, the second terminal may return the second location information to the first terminal by using the following manner:

returning, by the second terminal, the second location information presented on a map to the first terminal.

In this embodiment of the present disclosure, a process of establishing a connection between the second terminal and the target object is as follows:

Step A: The second terminal sends the first broadcast message carrying the identifier of the target object.

Step B: After detecting the first broadcast message, and determining that the identifier of the target object carried in the first broadcast message is an identifier of this target object, the target object sends, to the second terminal, the second broadcast message carrying the identifier of the target object.

Step C: After detecting the second broadcast message, the second terminal sends a connection setup request to the target object, to request to establish a connection to the target object.

Step D: After receiving the connection setup request, the target object establishes a connection to the second terminal.

Further, to improve security, after the target object establishes the connection to the second terminal, two-way authentication needs to be performed between the target object and the second terminal. The second terminal returns the second location information to the first terminal only after the two-way authentication succeeds.

Figure 5A:
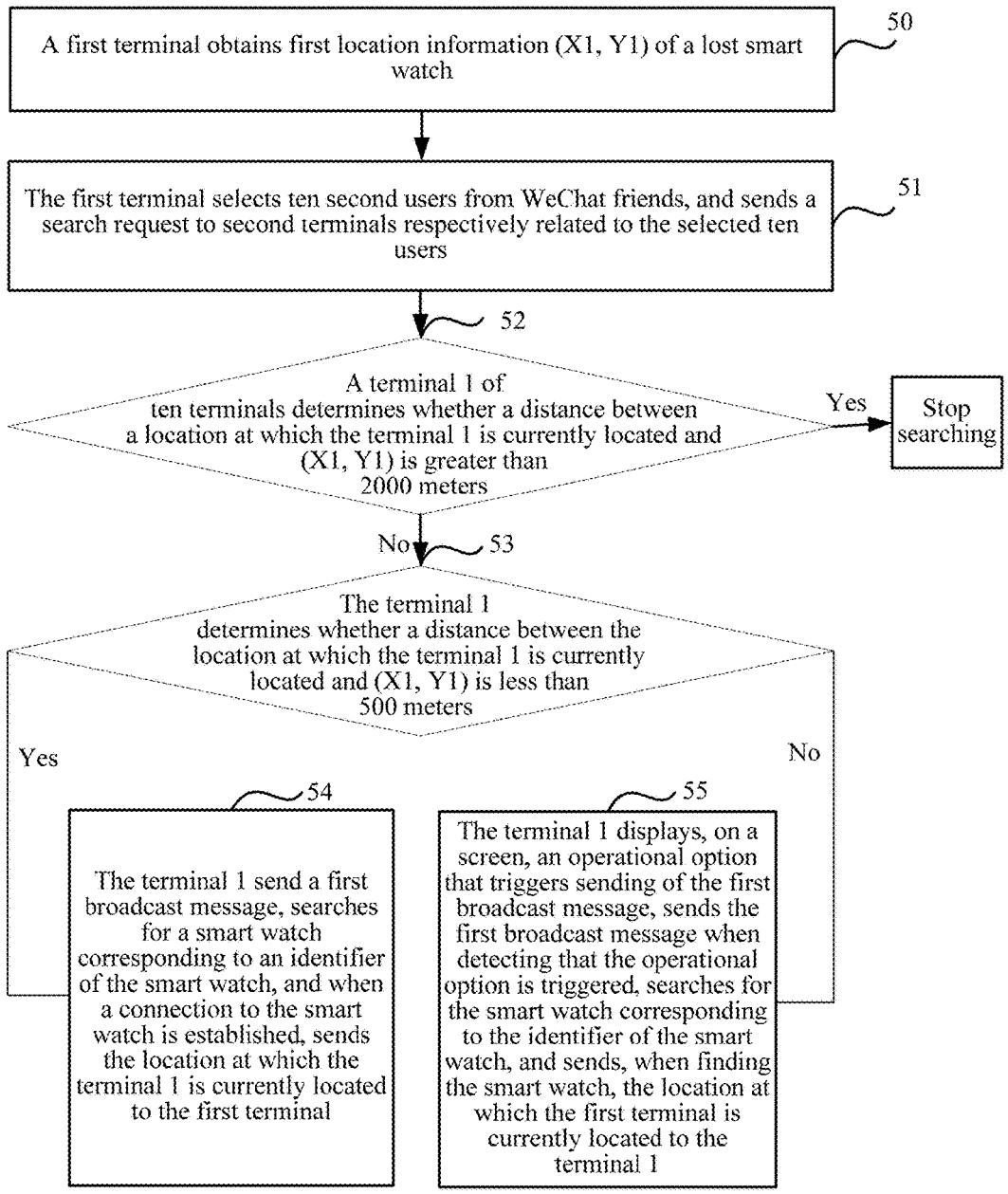
FIG. 5A is an embodiment of obtaining location information of a target object according to an embodiment of the present disclosure.

Referring to FIG. 5A, to better understand the embodiments of the present disclosure, a specific application scenario is provided below to further describe in detail a process of obtaining location information of a target object.

Step 50: A first terminal obtains first location information (X1, Y1) of a lost smart watch.

Step 51: The first terminal selects ten second users from WeChat friends, and sends a search request to second terminals respectively related to the selected ten users.

The search request carries an identifier of the smart watch and the first location information.

Step 52: A terminal 1 of ten terminals determines whether a distance between a location at which the terminal 1 is currently located and (X1, Y1) is greater than 2000 meters; and if yes, stops search; otherwise, performs step 53.

Step 53: The terminal 1 determines whether a distance between the location at which the terminal 1 is currently located and (X1, Y1) is less than 500 meters; and if yes, performs step 54; otherwise, performs step 55.

Step 54: The terminal 1 sends a first broadcast message, searches for a smart watch corresponding to an identifier of the smart watch, and when a connection to the smart watch is established, sends the location at which the terminal 1 is currently located to the first terminal.

Step 55: The terminal 1 displays, on a screen, an operational option that triggers sending of a first broadcast message, sends the first broadcast message when detecting that the operational option is triggered, searches for the smart watch corresponding to the identifier of the smart watch, and sends, when finding the smart watch, the location at which the first terminal is currently located to the terminal 1.

A search process of the terminal 1 is described in step 52 to step 56. The remaining nine terminals execute the same process as the terminal 1, and details are not described herein one by one.

Figure 5B:
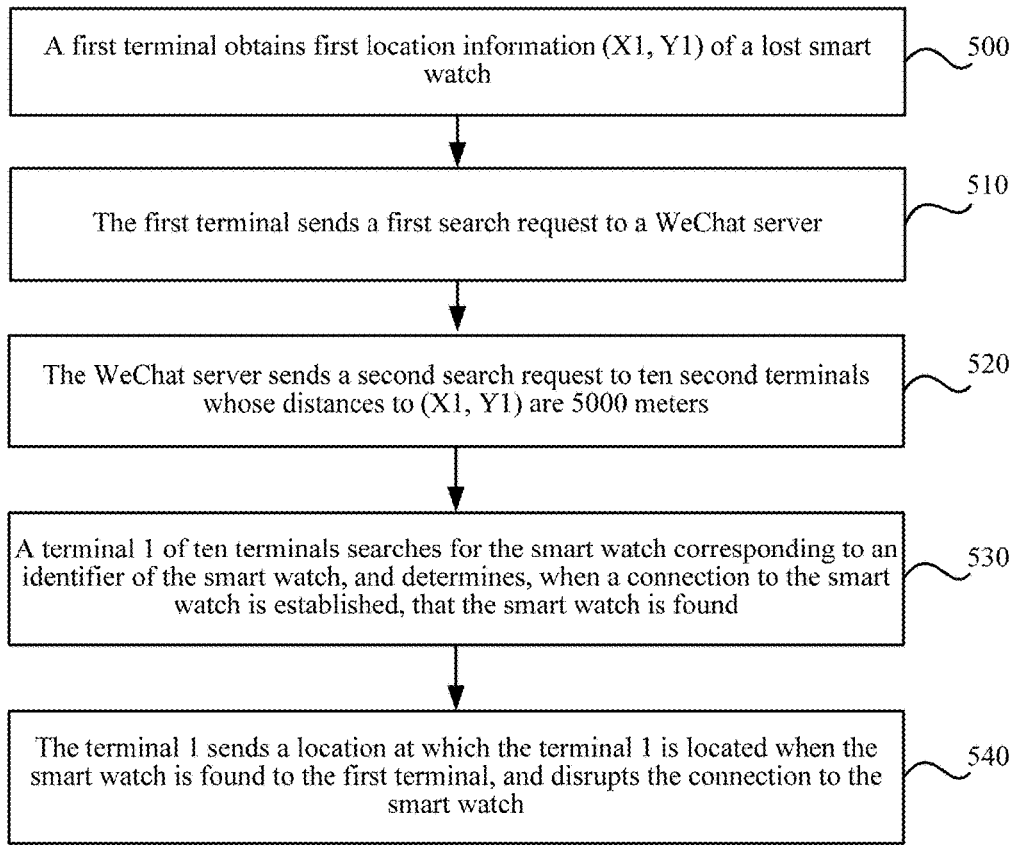
FIG. 5B is another embodiment of obtaining location information of a target object according to an embodiment of the present disclosure.

Referring to FIG. 5B, to better understand the embodiments of the present disclosure, a specific application scenario is provided below to further describe, in detail, a process of obtaining location information of a target object.

Step 500: A first terminal obtains first location information (X1, Y1) of a lost smart watch.

Step 510: The first terminal sends a first search request to a WeChat server.

The first search request carries the first location information, identifier information of the smart watch, and a stranger access rights information credential.

Step 520: The WeChat server sends a second search request to ten second terminals whose distances to (X1, Y1) are 5000 meters.

The second search request carries an identifier of the smart watch and the stranger access rights information credential.

Step 530: A terminal 1 of ten terminals searches for the smart watch corresponding to an identifier of the smart watch, and determines, when a connection to the smart watch is established, that the smart watch is found.

Step 540: The terminal 1 sends a location at which the terminal 1 is located when the smart watch is found to the first terminal, and disrupts the connection to the smart watch.

A search process of the terminal 1 is described in step 530 and step 540. The remaining nine terminals execute the same process as the terminal 1, and details are not described herein one by one.

Figure 6A:
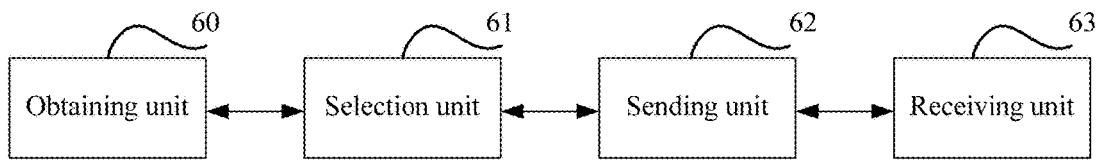
FIG. 6A is a schematic structural functional diagram of a first terminal according to an embodiment of the present disclosure.

Based on the technical solution of the foregoing corresponding method, referring to FIG. 6A, an embodiment of the present disclosure provides a first terminal. The first terminal includes an obtaining unit 60, a selection unit 61, a sending unit 62, and a receiving unit 63.

The obtaining unit 60 is configured to obtain first location information of a target object, where the first location information is location information of a location at which the first terminal is located when a connection between the first terminal and the target object is disrupted.

The selection unit 61 is configured to select at least one second user from a user relationship chain of a first user according to a user selection instruction of the first user.

The sending unit 62 is configured to send a search request to a second terminal respectively related to the at least one second user, where the search request carries an identifier of the target object and the first location information, and the search request is used to instruct the second terminal to search, according to the first location information, for the target object corresponding to the identifier of the target object.

The receiving unit 63 is configured to receive second location information returned by at least one second terminal, and determine the second location information as location information of a location at which the target object is located, where the second location information is location information of a location at which the second terminal is located when a connection between the second terminal and the target object is established.

In this embodiment of the present disclosure, optionally, the user relationship chain is at least one of the following: a contact in a contact list, a user relationship chain in a communication application, or a user relationship chain in a social application.

In this embodiment of the present disclosure, further, the sending unit 62 is further configured to:

send a first search request to a server, where the first search request carries the identifier of the target object, information about the at least one second user, and the first location information, and the first search request is used to instruct the server to send the search request to the second terminal respectively related to the at least one second user.

In this embodiment of the present disclosure, optionally, the receiving unit 63 is specifically configured to:

receive the second location information that is presented on a map and that is returned by the at least one second terminal.

In this embodiment of the present disclosure, further, the sending unit 62 is further configured to send voice information to the second terminal; and the receiving unit 63 is further configured to receive voice information fed back by the second terminal.

Based on the technical solution of the foregoing corresponding method, referring to FIG. 6A, an embodiment of the present disclosure further provides a first terminal. The first terminal includes a processor 600, a transmitter 610, and a receiver 620.

The processor 600 is configured to obtain first location information of a target object, where the first location information is location information of a location at which the first terminal is located when a connection between the first terminal and the target object is disrupted.

The processor 600 is further configured to select at least one second user from a user relationship chain of a first user according to a user selection instruction of the first user.

The processor 610 is configured to send a search request to a second terminal respectively related to the at least one second user, where the search request carries an identifier of the target object and the first location information, and the search request is used to instruct the second terminal to search, according to the first location information, for the target object corresponding to the identifier of the target object.

The receiver 620 is configured to receive second location information returned by at least one second terminal, and determine the second location information as location information of a location at which the target object is located, where the second location information is location information of a location at which the second terminal is located when a connection between the second terminal and the target object is established.

Figure 7A:
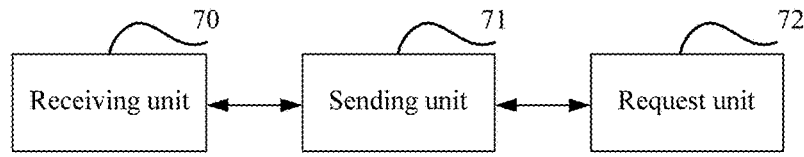
FIG. 7A is a schematic structural functional diagram of a second terminal according to an embodiment of the present disclosure.

Based on the technical solution of the foregoing corresponding method, referring to FIG. 7A, an embodiment of the present disclosure provides a second terminal. The second terminal includes a receiving unit 70, a sending unit 71, and a request unit 72.

The receiving unit 70 is configured to receive a search request. The search request carries an identifier of a target object and first location information, and the first location information is location information of a location at which the first terminal is located when a connection between a first terminal and the target object is disrupted.

The sending unit 71 is configured to: when it is determined that a distance between a location at which the terminal is located and the location represented by the first location information is less than or equal to a first threshold, send a first broadcast message carrying the identifier of the target object.

The request unit 72 is configured to: when a second broadcast message sent by the target object is detected, request to establish a connection to the target object.

The sending unit 71 is further configured to: after the connection to the target object is established, return second location information to the first terminal. The second location information is location information of a location at which the terminal is located when the connection between the terminal and the target object is established.

In this embodiment of the present disclosure, optionally, the receiving unit 70 is specifically configured to:

receive the search request sent by the first terminal or a server.

Figure 7B:
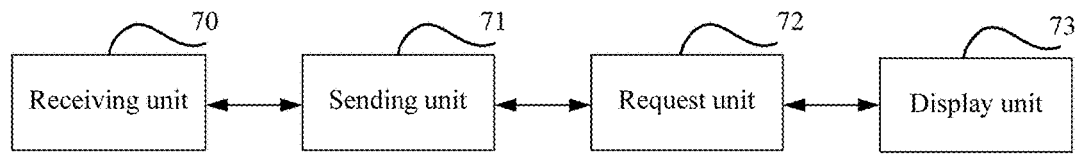
FIG. 7B is another schematic structural functional diagram of a second terminal according to an embodiment of the present disclosure.

As shown in FIG. 7B, in this embodiment of the present disclosure, further, a display unit 73 is further included. The display unit 73 is configured to:

display, on a screen in real time, the location at which the second terminal is currently located, the location represented by the first location information, and the distance between the location at which the second terminal is currently located and the location represented by the first location information.

In this embodiment of the present disclosure, further, if the distance between the location at which the second terminal is currently located and the location represented by the first location information is greater than a second threshold, the display unit 73 displays, on the screen, an operational option that triggers sending of the first broadcast message, where the first threshold is greater than the second threshold.

The sending unit 71 is further configured to:

when the display unit 73 detects that the operational option is triggered, send the first broadcast message.

In this embodiment of the present disclosure, optionally, if the distance between the location at which the terminal is currently located and the location represented by the first location information is less than or equal to a second threshold, where the first threshold is greater than the second threshold, the sending unit 71 is specifically configured to send the broadcast message directly.

In this embodiment of the present disclosure, optionally, the sending unit 71 is specifically configured to:

return the second location information presented on a map to the first terminal.

In this embodiment of the present disclosure, further, the receiving unit 70 is further configured to receive voice information sent by the first terminal; and the sending unit 71 is further configured to feed back voice information to the first terminal.

Based on the technical solution of the foregoing corresponding method, referring to FIG. 7A, an embodiment of the present disclosure provides a second terminal. The second terminal includes a receiver 700, a transmitter 710, and a processor 720.

The receiver 700 is configured to receive a search request, where the search request carries an identifier of a target object and first location information, and the first location information is location information of a location at which the first terminal is located when a connection between a first terminal and the target object is disrupted.

The transmitter 710 is configured to: when it is determined that a distance between a location at which the terminal is located and the location represented by the first location information is less than or equal to a first threshold, send a first broadcast message carrying the identifier of the target object.

The processor 720 is configured to: when a second broadcast message sent by the target object is detected, request to establish a connection to the target object.

The transmitter 710 is further configured to: after the connection to the target object is established, return second location information to the first terminal. The second location information is location information of a location at which the terminal is located when the connection between the terminal and the target object is established.

Figure 8A:
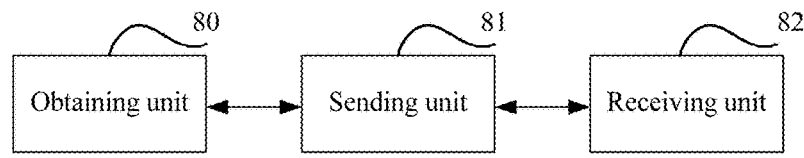
FIG. 8A is anther schematic structural functional diagram of a first terminal according to an embodiment of the present disclosure.

Based on the technical solution of the foregoing corresponding method, referring to FIG. 8A, an embodiments of the present disclosure provides a first terminal. The first terminal includes an obtaining unit 80, a sending unit 81, and a receiving unit 82.

The obtaining unit 80 is configured to obtain first location information of a target object, where the first location information is location information of a location at which the first terminal is located when a connection between the first terminal and the target object is disrupted.

The sending unit 81 is configured to: send a first search request to a server. The first search request carries an identifier of the target object, the first location information, and a stranger access rights information credential, and the stranger access rights information credential is used to instruct a second terminal to disrupt a connection to the target object after a second terminal returns second location information to the first terminal. The first search request is used to instruct the server to send a second search request to at least one second terminal. The second terminal is a terminal whose distance to the location represented by the first location information is less than or equal to a preset distance. The second search request carries the identifier of the target object and the stranger access rights information credential, and the second search request is used to instruct the at least one second terminal to search for the target object corresponding to the identifier of the target object.

The receiving unit 82 is configured to receive the second location information returned by the at least one second terminal, and determine the second location information as location information of a location at which the target object is located, where the second location information is location information of a location at which the second terminal is located when a connection between the second terminal and the target object is established.

In this embodiment of the present disclosure, optionally, the receiving unit 82 is specifically configured to:

receive the second location information that is presented on a map and that is returned by the at least one second terminal.

Figure 8B:
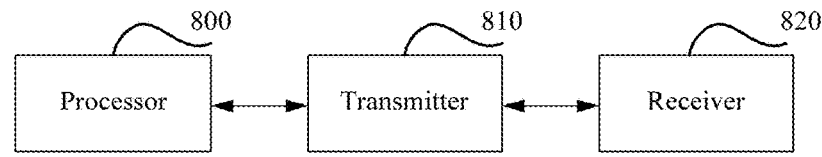
FIG. 8B is anther schematic structural functional diagram of a first terminal according to an embodiment of the present disclosure.

Based on the technical solution of the foregoing corresponding method, referring to FIG. 8B, an embodiment of the present disclosure further provides a first terminal. The first terminal includes a processor 800, a transmitter 810, and a receiver 820.

The processor 800 is configured to obtain first location information of a target object, where the first location information is location information of a location at which the first terminal is located when a connection between the first terminal and the target object is disrupted.

The sender 810 is configured to: send a first search request to a server. The first search request carries an identifier of the target object, the first location information, and a stranger access rights information credential, and the stranger access rights information credential is used to instruct a second terminal to disrupt a connection to the target object after a second terminal returns second location information to the first terminal. The first search request is used to instruct the server to send a second search request to at least one second terminal. The second terminal is a terminal whose distance to the location represented by the first location information is less than or equal to a preset distance. The second search request carries the identifier of the target object and the stranger access rights information credential, and the second search request is used to instruct the at least one second terminal to search for the target object corresponding to the identifier of the target object.

The receiver 820 is configured to receive the second location information returned by the at least one second terminal, and determine the second location information as location information of a location at which the target object is located. The second location information is location information of a location at which the second terminal is located when a connection between the second terminal and the target object is established.

Figure 9A:
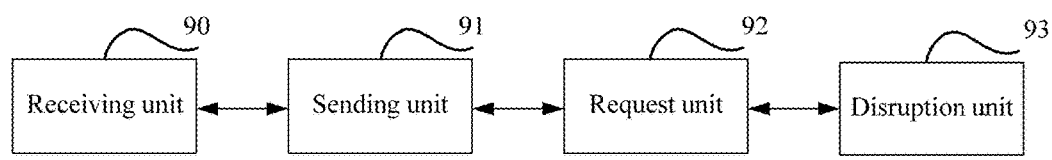
FIG. 9A is another schematic structural functional diagram of a second terminal according to an embodiment of the present disclosure.

Based on the technical solution of the foregoing corresponding method, referring to FIG. 9A, an embodiment of the present disclosure provides a second terminal. The second terminal includes a receiving unit 90, a request unit 92, and a disruption unit 93.

The receiving unit 90 is configured to receive a second search request sent by a server. The second search request carries an identifier of a target object and a stranger access rights information credential.

The sending unit 91 is configured to send a first broadcast message carrying the identifier of the target object.

The request unit 92 is configured to: when a second broadcast message sent by the target object is detected, request to establish a connection to the target object.

The sending unit 91 is further configured to: when the connection to the target object is established, return second location information to a first terminal. The second location information is location information of a location at which the second terminal is located when the connection between the second terminal and the target object is established.

The disruption unit 93 is configured to: after the second location information is returned to the first terminal according to the stranger access rights information credential, disrupt the connection to the target object.

In this embodiment of the present disclosure, further, the sending unit 91 is further configured to:

send a notification message to the target object, where the notification message is used to notify the target object that the second terminal already sends the second location information to the first terminal; and send the stranger access rights information credential to the target object, so that after receiving the notification message, the target object disrupts the connection to the second terminal according to the stranger access rights information credential.

In this embodiment of the present disclosure, further, the receiving unit 90 is further configured to:

return the second location information presented on a map to the first terminal.

Figure 9B:
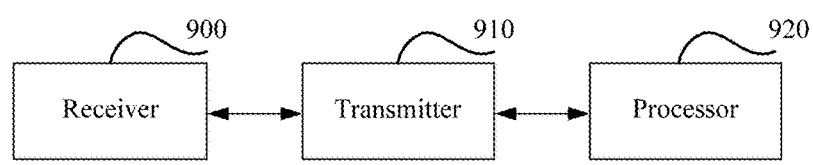
FIG. 9B is another schematic structural functional diagram of a second terminal according to an embodiment of the present disclosure.

Based on the technical solution of the foregoing corresponding method, referring to FIG. 9B, an embodiment of the present disclosure provides a second terminal. The second terminal includes a receiver 900, a transmitter 910, and a processor 920.

The receiver 900 is configured to receive a second search request sent by a server. The second search request carries an identifier of a target object and a stranger access rights information credential.

The transmitter 910 is configured to send a first broadcast message carrying the identifier of the target object.

The processor 920 is configured to: when a second broadcast message sent by the target object is detected, request to establish a connection to the target object.

The transmitter 910 is further configured to: when the connection to the target object is established, return second location information to a first terminal. The second location information is location information of a location at which the second terminal is located when the connection between the second terminal and the target object is established.

The processor 920 is configured to: after the second location information is returned to the first terminal according to the stranger access rights information credential, disrupt the connection to the target object.

Figure 6B:
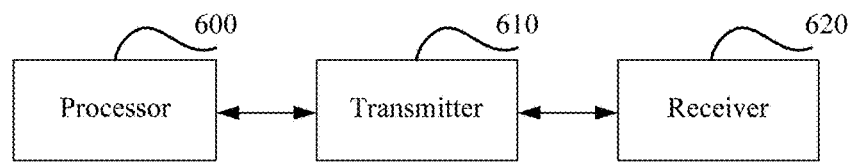
FIG. 6B is anther schematic structural functional diagram of a first terminal according to an embodiment of the present disclosure.
Figure 7C:
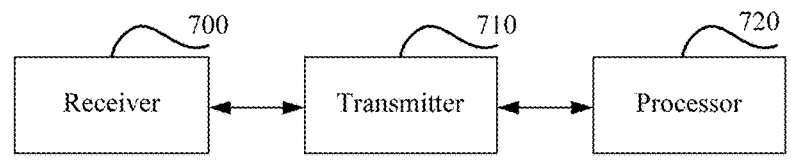
FIG. 7C is another schematic structural functional diagram of a second terminal according to an embodiment of the present disclosure.
Figure 10:
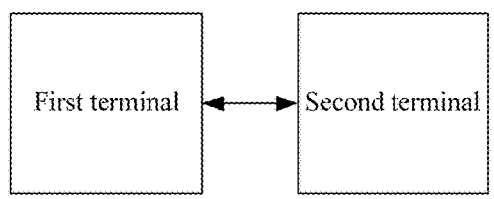
FIG. 10 is a schematic structural functional diagram of a system for obtaining location information of a target object according to an embodiment of the present disclosure.

Based on the technical solution of the foregoing corresponding method, referring to FIG. 10, an embodiment of the present disclosure further provides a schematic diagram of a system for obtaining location information of a target object, including the first terminals shown in FIG. 6A and FIG. 6B, and the second terminals shown in FIG. 7A to FIG. 7C; or including the first terminals shown in FIGS. 8A and 8B, and the second terminals shown in FIG. 9A and FIG. 9B.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the example embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method for obtaining location information of a target object, comprising:
    obtaining, by a first terminal, first location information of a target object, wherein the first location information is a location at which the first terminal is located when a connection between the first terminal and the target object is disrupted;

selecting, by the first terminal, at least one second user from a user relationship chain of a first user according to a user selection instruction of the first user;

sending, by the first terminal, a search request to a second terminal respectively related to the at least one second user, wherein the search request carries an identifier of the target object and the first location information, and the search request is used to instruct the second terminal to search, according to the first location information, for the target object corresponding to the identifier of the target object; and receiving, by the first terminal, second location information that is presented on a map and that is returned by the second terminal, and determining the second location information as a location at which the target object is located, wherein the second location information is a location at which the second terminal is located when a connection between the second terminal and the target object is established, wherein the user relationship chain is at least one of the following: a contact in a contact list, a user relationship chain in a communication application, or a user relationship chain in a social application.

2. The method according to claim 1, wherein the sending, by the first terminal, a search request to the second terminal respectively related to the at least one second user specifically comprises:

sending, by the first terminal, a first search request to a server, wherein the first search request carries the identifier of the target object, information about the at least one second user, and the first location information, and the first search request is used to instruct the server to send the search request to the second terminal respectively related to the at least one second user.

3. The method according to claim 1, after the sending, by the first terminal, the search request, and before the receiving the second location information, further comprising:

sending, by the first terminal, voice information to the second terminal, and receiving voice information fed back by the second terminal.

4. The first terminal according to claim 1, wherein the receiver is further configured to:

receive the second location information that is presented on a map and that is returned by the second terminal.

5. The first terminal according to claim 1, wherein the transmitter is further configured to:

send voice information to the second terminal, and receiving voice information fed back by the second terminal.

6. A method for obtaining location information of a target object, comprising:

receiving, by a second terminal, a search request, wherein the search request carries an identifier of a target object and first location information, and the first location information is a location at which the first terminal is located when a connection between a first terminal and the target object is disrupted;

sending, by the second terminal, a first broadcast message carrying the identifier of the target object when determining that a distance between a location at which the second terminal is located and the location represented by the first location information is less than or equal to a first threshold;

displaying, by the second terminal on a screen in real time, the location at which the second terminal is currently located, the location represented by the first location information, and the distance between the location at which the second terminal is currently located and the location represented by the first location information;

requesting, by the second terminal, to establish a connection to the target object when detecting a second broadcast message sent by the target object; and returning, by the second terminal, second location information to the first terminal after the connection to the target object is established, wherein the second location information is a location at which the second terminal is located when the connection between the second terminal and the target object is established.

7. The method according to claim 6, wherein the receiving, by the second terminal, the search request specifically comprises:

receiving, by the second terminal, the search request sent by the first terminal or a server.

8. The method according to claim 6, after the displaying, by the second terminal on a screen in real time, the location at which the second terminal is currently located, the location represented by the first location information, and the distance, further comprising:

if the distance between the location at which the second terminal is currently located and the location represented by the first location information is greater than a second threshold, displaying, by the second terminal on the screen, an operational option that triggers sending of the first broadcast message, wherein the first threshold is greater than the second threshold; and the sending, by the second terminal, a first broadcast message carrying the identifier of the target object specifically comprises:

sending, by the second terminal, the first broadcast message when the second terminal detects that the operational option is triggered.

9. The method according to claim 6, wherein if the distance between the location at which the second terminal is currently located and the location represented by the first location information is less than or equal to a second threshold, wherein the first threshold is greater than the second threshold, the sending, by the second terminal, a first broadcast message carrying the identifier of the target object specifically comprises:

sending, by the second terminal, the first broadcast message directly.

10. A first terminal, comprising:

a memory comprising instructions;

a processor communication with the memory wherein the processor executes the instructions to:

obtain first location information of a target object, wherein the first location information is a location at which the first terminal is located when a connection between the first terminal and the target object is disrupted;

select at least one second user from a user relationship chain of a first user according to a user selection instruction of the first user;

a transmitter, configured to send a search request to a second terminal respectively related to the at least one second user, wherein the search request carries an identifier of the target object and the first location information, and the search request is used to instruct the second terminal to search, according to the first location information, for the target object corresponding to the identifier of the target object; and a receiver, configured to receive the second location information that is presented on a map and that is returned by the second terminal, and determine the second location information as a location at which the target object is located, wherein the second location information is a location at which the second terminal is located when a connection between the second terminal and the target object is established, and wherein the user relationship chain is at least one of the following: a contact in a contact list, a user relationship chain in a communication application, or a user relationship chain in a social application.

11. The first terminal according to claim 10, wherein the transmitter is further configured to:

send a first search request to a server, wherein the first search request carries the identifier of the target object, information about the at least one second user, and the first location information, and the first search request is used to instruct the server to send the search request to the second terminal respectively related to the at least one second user.

12. A second terminal, comprising:

a receiver, configured to receive a search request, wherein the search request carries an identifier of a target object and first location information, and the first location information is a location at which the first terminal is located when a connection between a first terminal and the target object is disrupted;

a transmitter, configured to:

send a first broadcast message carrying the identifier of the target object when it is determined that a distance between a location at which the second terminal is located and the location represented by the first location information is less than or equal to a first threshold, wherein the second terminal further comprises a display screen, and the display screen is configured to display the location at which the second terminal is currently located, the location represented by the first location information, and the distance between the location at which the second terminal is currently located and the location represented by the first location information;

request to establish a connection to the target object when detecting a second broadcast message sent by the target object; and return second location information to the first terminal after the connection to the target object is established, wherein the second location information is a location at which the second terminal is located when the connection between the second terminal and the target object is established.

13. The second terminal according to claim 12, wherein the receiver is further configured to receive the search request sent by the first terminal or a server.

14. The second terminal according to claim 12, wherein the display screen is further configured to display an operational option that triggers sending of the first broadcast message if the distance between the location at which the second terminal is currently located and the location represented by the first location information is greater than a second threshold, wherein the first threshold is greater than the second threshold; and the transmitter is further configured to send the first broadcast message when the second terminal detects that the operational option is triggered.

15. The second terminal according to claim 12, wherein the transmitter is further configured to send the first broadcast message directly if the distance between the location at which the second terminal is currently located and the location represented by the first location information is less than or equal to a second threshold, wherein the first threshold is greater than the second threshold.

* * * * *